(12) United States Patent
Krolewski et al.

(10) Patent No.: US 10,518,609 B2
(45) Date of Patent: Dec. 31, 2019

(54) AIR OUTLET FOR HEATING AND VENTILATION OR AIR-CONDITIONING SYSTEMS OF MOTOR VEHICLES

(71) Applicant: FORD GLOBAL TECHNOLOGIES, LLC, Dearborn, MI (US)

(72) Inventors: Ingo Krolewski, Neuss (DE); Sandra Krolewski, Neuss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 15/357,278

(22) Filed: Nov. 21, 2016

(65) Prior Publication Data

US 2017/0166036 A1    Jun. 15, 2017

(30) Foreign Application Priority Data

Dec. 9, 2015 (DE) .................. 10 2015 224 681

(51) Int. Cl.
*B60H 1/34* (2006.01)
*B60H 1/00* (2006.01)

(52) U.S. Cl.
CPC ....... *B60H 1/3421* (2013.01); *B60H 1/00985* (2013.01)

(58) Field of Classification Search
CPC .............. B60H 1/3421; B60H 1/00835; B60H 1/00871
See application file for complete search history.

(56) References Cited

U.S. PATENT DOCUMENTS

2015/0328958 A1* 11/2015 Winget, Jr. ........ B60H 1/00742
454/155

FOREIGN PATENT DOCUMENTS

| DE | 102008010391 A1 | 8/2009 | |
|---|---|---|---|
| DE | 102012020539 A1 | 4/2014 | |
| DE | 102015004062 A1 * | 8/2015 | ........... B60H 1/3414 |
| JP | 01115719 A * | 5/1989 | ......... B60H 1/00871 |

OTHER PUBLICATIONS

DE102015004062MT, Machine Translation of RAMPF Reference.*
JPH01115719MT, Machine Translation of Hirashima Reference.*
English Machine Translation of DE102008010391A1.
English Machine Translation of DE102012020539A1.

* cited by examiner

*Primary Examiner* — Gregory L Huson
*Assistant Examiner* — Elizabeth M. May
(74) *Attorney, Agent, or Firm* — Vichit Chea; King & Schickli, PLLC

(57) ABSTRACT

The invention relates to an air outlet for a heating and ventilation or air-conditioning system of a motor vehicle, wherein the air outlet has a body defining an air discharge opening, over which at least one elongate louver extends, which is pivotable about a longitudinal axis. At least one electric or electronic display and/or operating element of the heating and ventilation or air-conditioning system of the motor vehicle is integrated in the at least one louver, wherein each display and/or operating element is carried by the louver and is substantially flush with a substantially flat surface of the louver.

3 Claims, 3 Drawing Sheets

AIR OUTLET FOR HEATING AND VENTILATION OR AIR-CONDITIONING SYSTEMS OF MOTOR VEHICLES

TECHNICAL FIELD

The invention relates to an air outlet for a heating and ventilation or air-conditioning system of a motor vehicle, wherein the air outlet has an air discharge opening, over which at least one elongate louver, which can be pivoted about a longitudinal axis, extends.

BACKGROUND

In the case of motor vehicles, a component for delivering and directing a controlled amount of ambient air or heated or cooled air into the vehicle interior is referred to as an air outlet or air register. The strength of the airflow flowing out can be adjusted for example by means of a fan arranged upstream of the air outlet.

An air outlet contains a sort of grate, which is usually formed by a number of adjustable louvers, also referred to as air baffles, ribs, or wings, with which the flow direction of the airflow exiting from the air discharge opening can be varied. The louvers are generally adjusted manually by tabs arranged on louver assemblies or by control wheels arranged next to the louver assemblies.

A number of air outlets are usually distributed over the width of the dashboard, also referred to as the instrument panel. For example, one may be arranged on the left and one on the right and one or two in the middle, in order to be able to satisfy the individual requirements of different vehicle occupants in respect of ventilation, heating and cooling.

In modern passenger vehicles there is still the problem of utilization of the limited space available. This problem is exacerbated by the trend of providing increasingly larger screens inside the motor vehicle, for example on the center console of the vehicle. Although the screen makes it possible to accommodate a multiplicity of functions, which can be controlled in a software-assisted manner via a corresponding manipulation on the screen, the screen significantly reduces the space necessary for various buttons and operating knobs provided in the form of hardware, for example for controlling the start-stop function of the vehicle or the parking assistance of the vehicle or for controlling the heating and ventilation or air-conditioning system and the like.

An air outlet, generally of the type described, is known from EP 1 842 702 B1 as part of an air distribution system for the passenger compartment of a vehicle. The flow of air from an air outlet into the passenger compartment is controlled by an activation device which comprises a proximity sensor intended to activate the air outlet following the detection of the presence of a body, for example a hand, a short distance from the air outlet.

The document DE 10 2012 021 519 A1, which is likewise generic, discloses a ventilation system for a motor vehicle having a display and operating unit for selecting a ventilation region within the motor vehicle toward which airflow is to be directed and having a control unit for controlling variably adjustable air outlets, such that these direct an airflow to the ventilation region.

The document DE 10 2010 018 105 A1, which is likewise generic, discloses a vehicle cockpit which comprises at least one air outlet of a ventilation and air-conditioning system and also an operating device for detecting user inputs. If, during the operation of the operating device, a hand or an arm of the user is located for example in a monitored spatial region, the ventilation and air-conditioning system is controlled in such a way that no airflow in the region of the hand or arm is caused during the operation of the operating device by the user.

SUMMARY

On this basis, the object of the new air outlet, that is the subject matter of this document, is to provide an air outlet with which the space-related problem for accommodating display and/or operating elements in the interior of a motor vehicle is alleviated.

This object is achieved by an air outlet having the features set forth in the following claims.

In accordance with the air outlet, one or more electric or electronic display and/or operating elements of the heating and ventilation or air-conditioning system of the motor vehicle is/are integrated in the least one louver of the air outlet, wherein each display and/or operating element is carried by the louver and is substantially flush with a substantially flat surface of the louver.

The louvers of the air outlet can thus also take on functions that otherwise would have to be provided on a separate instrument panel for heating and ventilation or climate control and are located in an ergonomically particularly favorable location.

Electronic display elements that can be integrated in louvers of the air outlet are, for example, micro LEDs or very small screen display devices, which can also serve as operating elements when they are touch-sensitive. Pure operating elements that are suitable accordingly are, for example, microswitches or capacitive contact or proximity sensors.

A surface of the louver with which one or more display and/or operating elements can be substantially flush is in particular a broad side or a narrow side of the louver when the louver has a certain width and thickness transversely to its longitudinal direction, as is usual, wherein the width is several times greater than the thickness.

In preferred embodiments of the invention the air outlet has a plurality of louvers pivotable parallel to one another and jointly, as is known per se. As now disclosed for the first time, display and/or operating elements can be integrated in one or more louvers of the air outlet.

The louvers preferably have a width such that they can be pivoted in the manner of a blind into a closed position, in which they jointly substantially close the air discharge opening. In this way, the louvers in the closed state offer the viewer a more or less flat and more or less continuous surface, on which display and/or operating elements are located, each of which can extend over one or more louvers.

Air outlets according to the invention can be located in principle at any point in the motor vehicle, but are particularly suitable as air outlets in the vicinity of and in particular below or above a preferably touch-sensitive screen on the center console of the motor vehicle. Such a screen may be a part of what is known as an infotainment system, which amalgamates the display and operation of, for example, car radio, navigation system and various vehicle functions. A screen of this type can be fixedly installed or can be a removable touchscreen or a smartphone.

Central screens of this type can take up a lot of space and also offer space for full integration of display and/or operating elements of the heating and ventilation or air-conditioning system in the screen display when it is not desired to provide these elements as dedicated hardware in order to avoid overloading the center console with instruments. The screen display is then complex nonetheless, and the operator may have difficulty in finding the display and/or operating elements on the screen. With the invention, either in addition to or instead of the provision on the screen, the corresponding functions can be provided at least temporarily at the air outlet itself, i.e. where an operator expects them and thus finds them easily.

Particularly in the embodiment in which the air outlet is arranged in the vicinity of a screen on the center console, an automatic display toggle can—depending on signals of a position sensor of the air outlet—additionally or instead display on the screen those display and/or operating elements integrated in the louvers which, on account of the louver position, for example with open louvers, are not currently visible, in particular not to a seated driver or front passenger. By contrast, this screen display can be masked out whilst the display and/or operating elements are visible on account of the lower position, such that the screen displays less information in this state and/or is available for other information.

In the aforementioned embodiment the display and/or operating elements masked out from the screen in a position-dependent manner are preferably those that can possibly be displayed on the broad sides, but not on the narrow sides of the louvers. Elements displayed on the narrow sides can be a selection of display and/or operating elements reduced in terms of number and/or display size, which allow at least a vehicle occupant familiar therewith to have quick access to the associated information and functions without having to necessarily look at the screen.

The features specified individually in the claims can be combined with one another in any technically feasible manner and can thus lead to further embodiments of the invention. By way of example, only display elements or only operating elements can thus be integrated in the louvers.

BRIEF DESCRIPTION OF THE DRAWING FIGURES

A description will now be provided of exemplary embodiments with reference to perspective drawings, in which.

DETAILED DESCRIPTION

Figure 1:
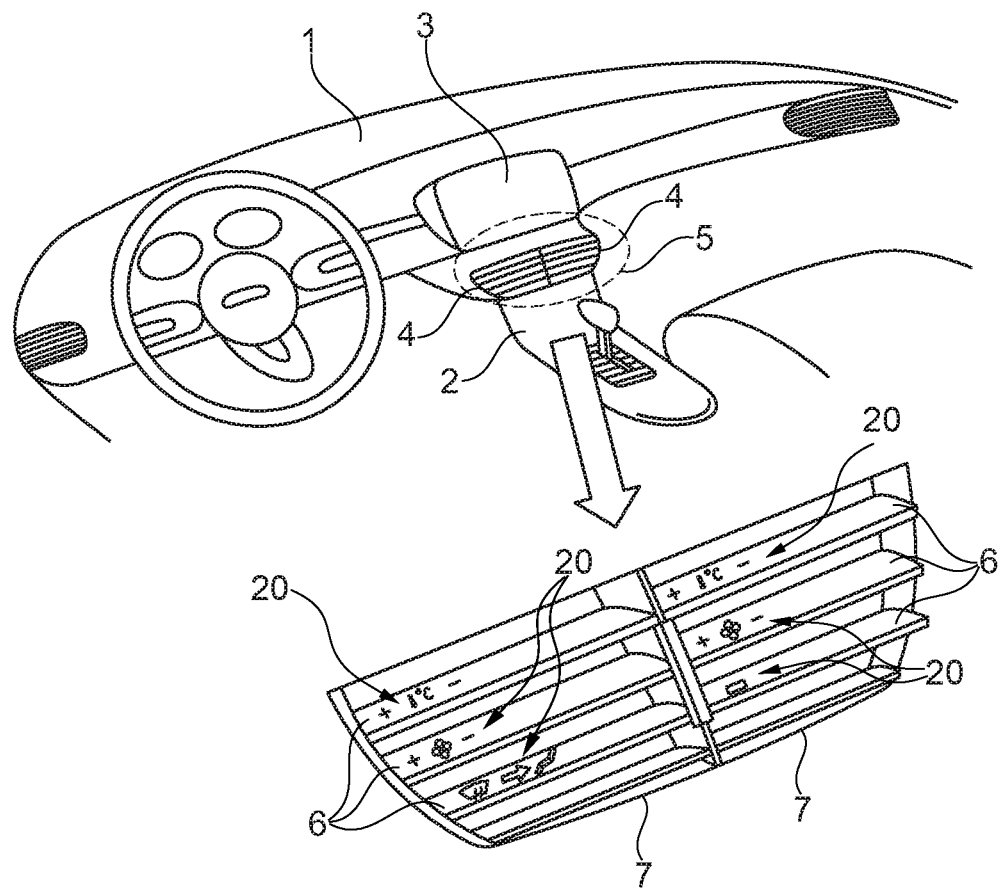
FIG. 1 shows a schematic view of a motor vehicle dashboard with a center console in which two air outlets with electric or electronic display and/or operating elements integrated in the louvers are arranged.

FIG. 1 is a schematic view of a motor vehicle dashboard 1 with a center console 2, in which an infotainment screen 3 and therebelow two air outlets 4 are arranged. Each air outlet 4 includes a body defining an air discharge opening 7.

The region around the air outlet 4 encircled by a solid line 5 is illustrated additionally in an enlarged manner at the bottom in FIG. 1, and in the enlargement it can be seen that louvers 6 in air discharge openings 7 of the air outlet 4 carry different electric devices 20 such as electric or electronic display and/or operating elements for a heating and ventilation or air-conditioning system of the motor vehicle, which are substantially flush with surfaces of the louvers 6.

Figure 2:
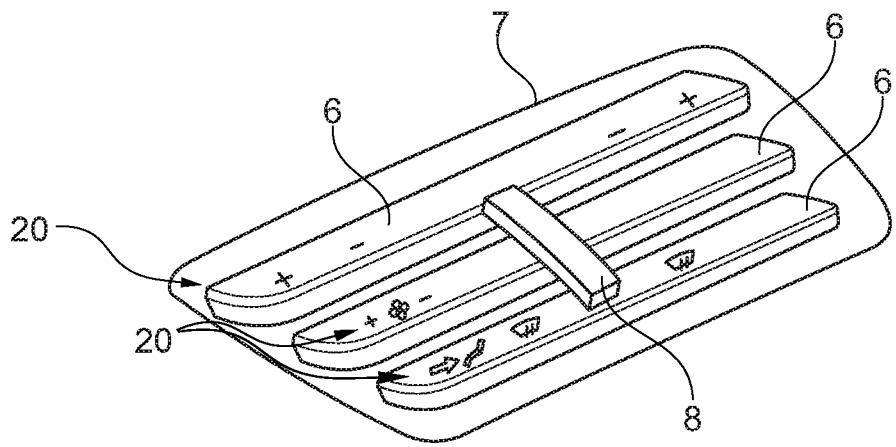
FIG. 2 shows an enlarged schematic view of the louver region of one of the air outlets in FIG. 1.

The region of the louvers 6 of one of the air outlets 4 in FIG. 1 is illustrated on an enlarged scale in FIG. 2. A tab 8 sits on the louvers 6, by means of which tab the louvers 6 can be jointly adjusted so as to vary the flow direction of the airflow exiting from the air discharge opening 7 or so as to close the air discharge opening 7, wherein FIG. 2 shows the state in which the louvers 6 are substantially closed. In this closed state the louvers 6 jointly form an instrument panel for climate control.

Figure 3:
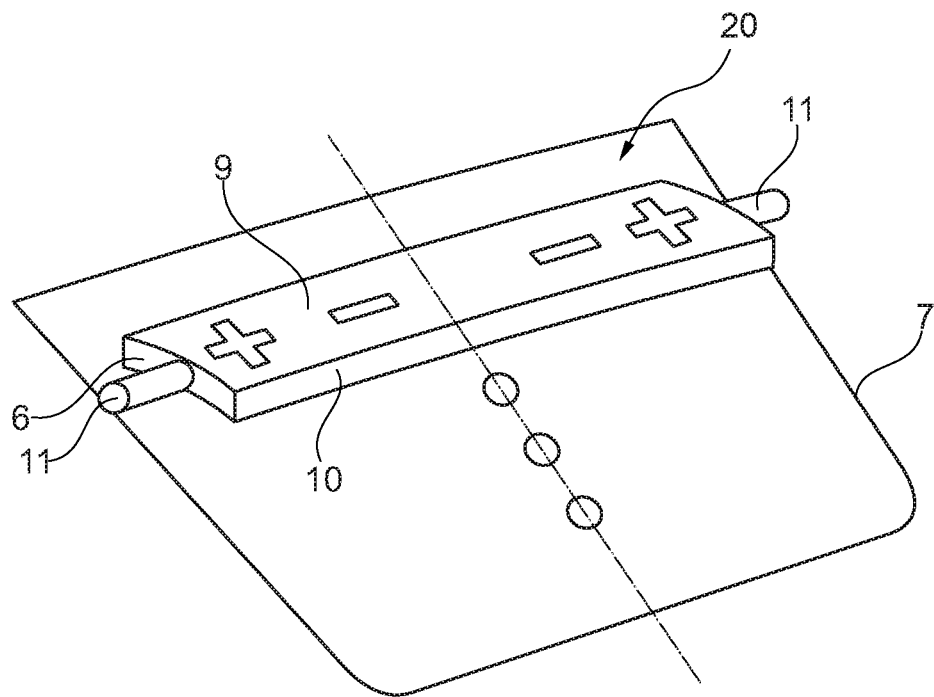
FIG. 3 shows an enlarged schematic view of one of the louvers in FIGS. 1 and 2.

FIG. 3 is an enlarged view of one of the louvers 6 in FIGS. 1 and 2. Each louver 6 is an elongate plastics part with a broad side 9 and a narrow side 10 and has at each of its two axial ends a bearing journal 11, by means of which the louver 6 is rotatably mounted about its longitudinal axis in the air discharge opening 7. The display and/or operating elements can be electrically connected via the bearing journals 11 to the heating and ventilation or air-conditioning system, for example by connection cables which pass axially through the bearing journals 11, or by radial sliding contacts on the bearing journals 11.

Figure 4:
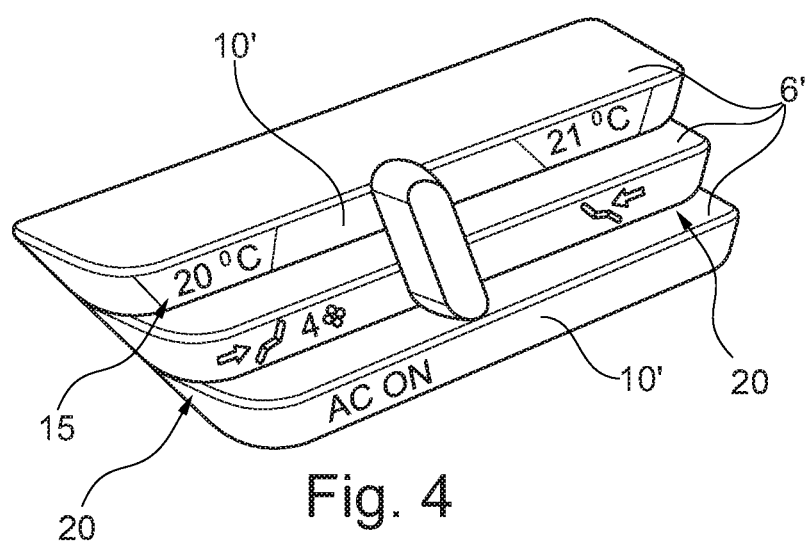
FIG. 4 shows an enlarged schematic view showing an alternative or additional integration of display and/or operating elements in the louvers of an air outlet.

FIG. 4 is a view corresponding to FIG. 2, but shows, compared to the embodiment of FIG. 2, an alternative or additional integration of display and/or operating elements, inter alia a temperature display 15, in louvers 6'. The louvers 6' in FIG. 4 have slightly wider narrow sides 10' compared to the louvers 6 in FIGS. 1 to 3, and the wider narrow sides 10' carry another selection of electric or electronic display and/or operating elements 20 for the heating and ventilation or air-conditioning system or a selection of such elements that is reduced in terms of number and/or display size.

Figure 5:
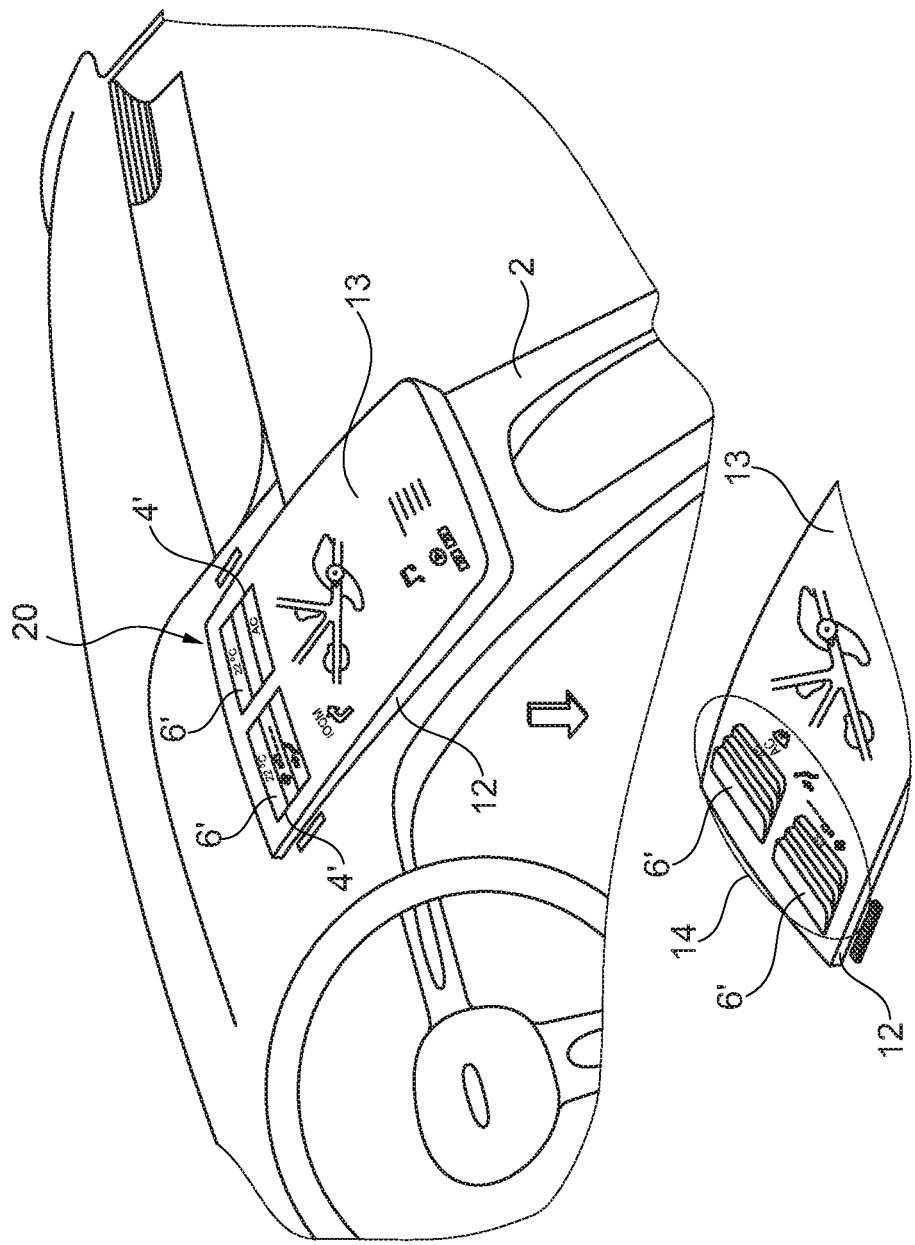
FIG. 5 shows a schematic view of a region around the center console in a motor vehicle, in which a screen and thereabove two air outlets with display and/or operating elements integrated in the louvers are installed.

FIG. 5 shows an exemplary embodiment in which an operating and display panel 12 is mounted on a center console 2' of a motor vehicle and is divided into a screen region 13 and an air outlet region, arranged directly thereabove, having two air outlets 4', which form an instrument panel for climate control when their louvers 6' formed as in FIG. 4 are closed.

At the bottom in FIG. 5, a portion of the operating and display panel 12 when the louvers 6' are slightly opened is additionally shown. In this state the display and/or operating elements 20 displayed on the narrow sides 10' of the louvers 6' are visible, as illustrated in an enlarged manner in FIG. 4. If the narrow sides 10' are not sufficient to display all necessary display and/or operating elements 20, supplementary display and/or operating elements can be shown in an identical manner below the air outlets 4' in the screen region 13, as is indicated roughly in the region around the air outlets 4' encircled by a solid line 14. This can be implemented with the control of a display toggle provided in software, depending on the current pivot position of the louvers 6' identified by means of sensor signals.

The invention claimed is:

1. An air outlet for a heating and ventilation or air-conditioning system of a motor vehicle, comprising:
   a body defining an air discharge outlet wherein said air discharge outlet is arranged on a dashboard of the motor vehicle;
   at least one elongated louver extending over said air discharge outlet wherein said at least one elongated louver is pivotable about a longitudinal axis;
   at least one electric device integrated into a surface of said at least one elongated louver wherein (a) said at least one electric device is selected from a group of electric devices consisting of an electric display device, an electric operating element, and combinations thereof, (b) said at least one electric device is a display or operating element of said heating and ventilation or air-conditioning system and (c) said at least one electric device is substantially flush with said surface and said surface is substantially flat;

a touch-sensitive screen on a center console of the motor vehicle wherein said air discharge outlet is arranged above said touch-sensitive screen;

a position sensor sensing a current position of said air outlet;

a display toggle displaying a display on said touch-sensitive screen and/or said operating element integrated into said at least one elongated louver depending upon a current position signal of said position sensor; and a plurality of louvers pivotable parallel to one another and jointly wherein said plurality of louvers are wide enough to jointly substantially close said air discharge opening.

2. The air outlet of claim 1, wherein said surface is a broad side of said at least one elongated louver.

3. The air outlet of claim 1, wherein said surface is a narrow side of said at least one elongated louver.

* * * * *